United States Patent [19]

Gawler

[11] Patent Number: 4,821,644
[45] Date of Patent: Apr. 18, 1989

[54] METHOD AND APPARATUS FOR POSITIONING A MEMBER

[75] Inventor: David A. Gawler, Brentwood, England

[73] Assignee: Alcatel Business Systems Limited, Essex, England

[21] Appl. No.: 28,755

[22] Filed: Mar. 23, 1987

[30] Foreign Application Priority Data

Mar. 25, 1986 [GB] United Kingdom ............... 8607367

[51] Int. Cl.4 .............................................. B41L 1/02
[52] U.S. Cl. .................................... 101/486; 101/91;
400/154.4; 318/602; 318/685; 318/696; 178/34;
235/132 E; 364/523
[58] Field of Search ............... 400/162.3, 154.4, 154.5,
400/704; 101/93.01, 91, 486; 364/464, 467, 200,
900, 523; 177/25; 235/103.5 R, 132 R, 132 A,
132 E; 318/696, 601, 602, 603, 671, 684, 685,
264–267; 178/34

[56] References Cited

U.S. PATENT DOCUMENTS

| | | | |
|---|---|---|---|
| 3,366,214 | 2/1968 | Tutert et al. ..................... | 400/154.4 |
| 3,573,589 | 4/1971 | Berry .................................. | 400/154.5 |
| 3,586,953 | 6/1971 | Markkanen ........................ | 400/154.5 |
| 3,816,656 | 6/1974 | Ludwig .............................. | 400/154.5 |
| 3,817,367 | 6/1974 | Tramposch et al. .............. | 400/154.5 |
| 3,878,372 | 4/1975 | Sinddelar .......................... | 101/91 |
| 3,924,721 | 12/1975 | Reynolds ........................... | 400/154.3 |
| 4,140,054 | 2/1979 | Martin et al. ..................... | 101/91 |
| 4,140,055 | 2/1979 | Lallemand ........................ | 101/91 |
| 4,142,140 | 2/1979 | Wiesner ............................. | 400/154.5 |
| 4,421,023 | 12/1983 | Kittredge .......................... | 101/91 |
| 4,481,604 | 11/1984 | Gilham et al. .................... | 101/91 |
| 4,541,746 | 9/1985 | Bobart ............................... | 400/154.4 |
| 4,559,443 | 12/1985 | Eckert et al. ..................... | 400/704 |
| 4,579,054 | 4/1986 | Buan et al. ........................ | 101/91 |

Primary Examiner—Eugene H. Eickholt
Attorney, Agent, or Firm—Shoemaker and Mattare, Ltd.

[57] ABSTRACT

The method utilizes an encoding switch to derive encoded position signals representing the current position of a member such as the print element of a franking machine. The switch has conductive strips and in order to ensure reliable operation of the switch the strips have substantial length. However for correct printing it is necessary that not only is the selected type character at the printing position but that it is precisely positioned to achieve correct printing of the character. In order to obtain this precise positioning of the print element the encoded position signals are utilized to move the selected type character to the print position and the print element is then moved by a predetermined distance to achieve precise positioning of the type character within the printing position.

10 Claims, 3 Drawing Sheets

METHOD AND APPARATUS FOR POSITIONING A MEMBER

BACKGROUND OF THE INVENTION

This invention relates to methods and apparatus for position of one member relative to another member. The position encoder may be a switch which is set in positions respectively representing different values for the derivation of electrical signals representative of those values. For example the electrical signals may represent decimal values in binary coded form.

British patent specification No. 2034991 discloses a ten position switch arranged to generate a 2 out of 5 binary code. This switch consists of five stationery conductive contact strips each consisting of interconnected inner and outer arcuate parts and two common conductor rings, the inner and outer arcuate parts and the common conductor rings being concentric with one another. A rotary part of the switch carries two bridging contacts. One of these contacts bridges between one common conductor ring and the inner arcuate parts and the other bridging contact bridges between the other common conductor ring and the outer arcuate parts. The arcuate contact parts are so arranged relative to one another that a unique 2 out of 5 binary code can be derived from the switch for each of ten positions of the switch.

Switches as described above may be utilised as sensors to derive signals representing the angular position of a movable member by mechanically connecting the member to the rotary part of the switch. Thus as the member moves from one to an adjacent position, the coded signal derived from the switch changes to that 2 out of 5 code which represents the new position of the member. However it will be appreciated that, in order to ensure reliable operation of the switch, the arcuate parts have substantial angular extent and in consequence the coded signal remains unaltered over a substantial angular movement of the member. Hence the coded signal only provides an indication that the member is positioned within a range of positions. While this may be satisfactory for many purposes it is sometimes necessary to provide an indication that a movable member is positioned not only within a selected range of positions but also that it is positioned at a precise selected position within that range.

In postal franking machines it is essential that the values of franking entered into the machine and registered in the electronic accounting portion of the machine are precisely the same at all times as those values which are printed on the mail item. The above described encoding switch is particularly suitable for use in sensing the setting of a printing element which is to be used in printing the franking value because any malfunction of the switch results in derivation of a binary code which is not recognised by the processing apparatus of the machine and therefore an error or malfunction indication is generated and operation of the printing is inhibited. However as mentioned above the switch provides a binary coded signal which indicates only to the extent that the rotary part of the switch lies within a range of positions. This is sufficient where the printing element is set manually by a thumb wheel provided with detents to ensure that the printing element is set to the precise position for printing the required value. If the detents are not provided, the printing element might be slightly offset from its correct position thereby resulting in defective printing of the selected value even though the switch would provide a correct indication of the value being printed.

SUMMARY OF THE INVENTION

According to one aspect of the invention a method of positioning a member at a precise determined location comprises the steps of deriving a code signal from position encoding means coupled to said member representing a current range of positions of said member; generating a new code signal representing a selected range of positions to which said member is to be moved; comparing the code signal derived from the encoding means with the new code signal; moving said member until said comparison indicates that the member has moved to said selected range of positions; and moving said member through a predetermined distance such that it is located at a precise determined position within said selected range of positions.

The member may be moved in a sequence of steps and movement of said member through said predetermined distance is effected by moving the member in a predetermined number of steps.

The method may include the step of deriving a further signal from the encoding means; said further signal having a first state when the member is positioned at the precise determined position within any of said ranges of positions and having a second state when the member is at any other position; and wherein the member is moved through the predetermined distance by moving the member until the further signal changes from said second state to said first state.

According to another aspect of the invention apparatus for positioning a member at a precise predetermined position within a selected one of a plurality of ranges of positions includes encoding means to derive a signal representing the current one of the plurality of ranges of positions at which the member is positioned; means to generate a new signal representing said selected one of said plurality of ranges of positions to which it is desired to move said member; comparison means for comparing said derived signal and said new signal; drive means responsive to said comparison means to move the member until said comparison means indicates that the member has moved to said selected range of positions; and control means operative when the member has moved to said selected range of positions to cause said drive means to move said member through a predetermined distance such that said member is positioned at said precise position within said selected range of positions.

According to a further aspect of the present invention a method of setting a print element of a franking machine to position a selected one of a plurality of type characters in a precise printing position comprises the steps of deriving a code signal from a position encoder coupled to said print element representing that type character currently in said printing position; generating a new code signal representing a selected type character to be moved into the printing position; comparing the code signal derived from the encoding switch with the new code signal; moving said print element until said comparison indicates that the selected type character is in the printing position; and moving said print element through a predetermined distance such that the selected type character is located at a precise determined position within said printing position.

According to yet another aspect of the invention apparatus for setting a print element of a franking machine with a selected one of a plurality of type characters at a precise predetermined position in a printing position includes position encoding means to derive a signal representing the current one of the plurality of type characters positioned at the printing position; means to generate a new signal representing said selected one of said plurality of type characters which it is desired to move to said printing position; comparison means for comparing said derived signal and said new signal; drive means responsive to said comparison means to move the print element until said comparison means indicates that the selected type character has moved to said printing position; and control means operative when the selected type character has moved to said printing position to cause said drive means to move said print element through a predetermined distance such that said selected type character is positioned at said precise position within the printing position.

DESCRIPTION OF THE PREFERRED EMBODIMENTS

Figure 1:
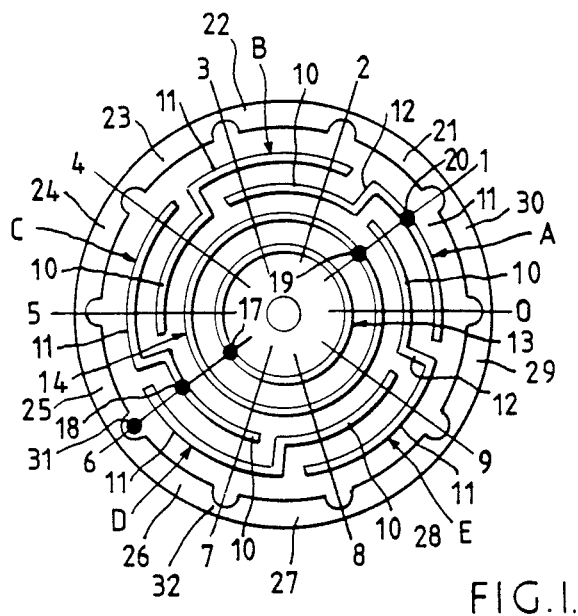
FIG. 1 shows the electrical arrangement of the conductive elements of an encoding switch.

Referring first to FIG. 1, the switch comprises five stationery conductive contact strips A, B, C, D and E each consisting of an inner arcuate part 10 connected to an outer arcuate part 11 by a radial part 12. The arcuate parts are concentric with one another and with common inner and outer rings 13 and 14 respectively. A rotary part 16 (shown in FIG. 2) of the switch carries two pairs of bridging contacts 17, 18 and 19, 20. The contact 17 wipes the inner ring 13 and contact 18 wipes the inner arcuate parts 10 of the conductive strips. The contact 19 wipes the outer ring 14 and contact 20 wipes the outer arcuate parts 11 of the contact strip. The contacts 18 and 20 are diametrically opposite one another. As seen in FIG. 1, the pair of contacts 17, 18 connect the inner arcuate part 10 of strip C to the inner ring 13 whereas the pair of contacts 19, 20 connect the outer arcuate part 11 of strip A to the outer ring 14. If the rotary part 16 is rotated to any of the positions indicated by the numerals 0 to 9 in FIG. 1 it will be seen that if the inner ring 13 is connected to a fixed potential and the contact strips A to E are interrogated sequentially a 5-bit binary word is read out. In the example illustrated, with contact 18 wiping strip C, the word 00100 is read out. If the ring 13 is now disconnected and the ring 14 connected to the fixed potential and the contact strips A to E are once again interrogated sequentially a second 5-bit binary word is read out. In the example this is 00001. The words are combined in an electronic processor to give a 2 out of 5 bit code word giving, in the example, the word 00101 representing decimal 1.

The 2 out of 5 bit word obtained for each of the ten positions is unique to that position and any error in function of the switch will not result in generation of one of the other code words representing a different decimal value.

In order to ensure reliable electrical contact between contacts 18, 20 and the inner and outer arcuate parts 10, 11 respectively and hence reliable operation of the switch in providing the binary coded outputs it is necessary for the inner and outer arcuate parts 10 and 11 to extend through a substantial angle. As a result he binary coded word representing any one of the ten decimal positions will be obtained over a range of angular positions of the rotary part of the switch.

Figure 2:
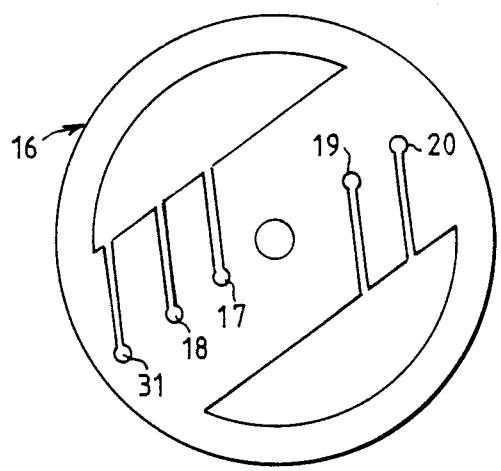
FIG. 2 shows the electrical arrangement of moving contacts of an encoding switch.

In the embodiment illustrated in FIGS. 1, and 2 a precise angular positional indication for each decimal position is provided by a set of arcuate strips 21 to 30 arranged as segments of a circle, concentric with the rings 13, 14, which are wiped by an additional contact 31 on the rotary part 16 of the switch. The gaps between adjacent ends of the strips are of a length slightly longer than the dimension of the contact 31 so that on rotation of the part 16, the contact 31 is isolated from the strips 21 to 30 each time it crosses the gap between strips. The gaps are positioned such that when the contact 31 lies in a gap, the contacts 18 and 20 lie within the length of the arcuate parts 10,11 respectively and the rotary part 16 of the switch is disposed precisely at a required angular position relative to the stationery part of the switch. The arcuate strips 21 to 30 are connected together in common by conductive portions 32 lying outside the track of contact 31. The contact 31 is shown connected to the pair of contacts 17,18 but it may be connected to either the pair of contacts 17, 18 or the pair 19, 20.

Figure 3:
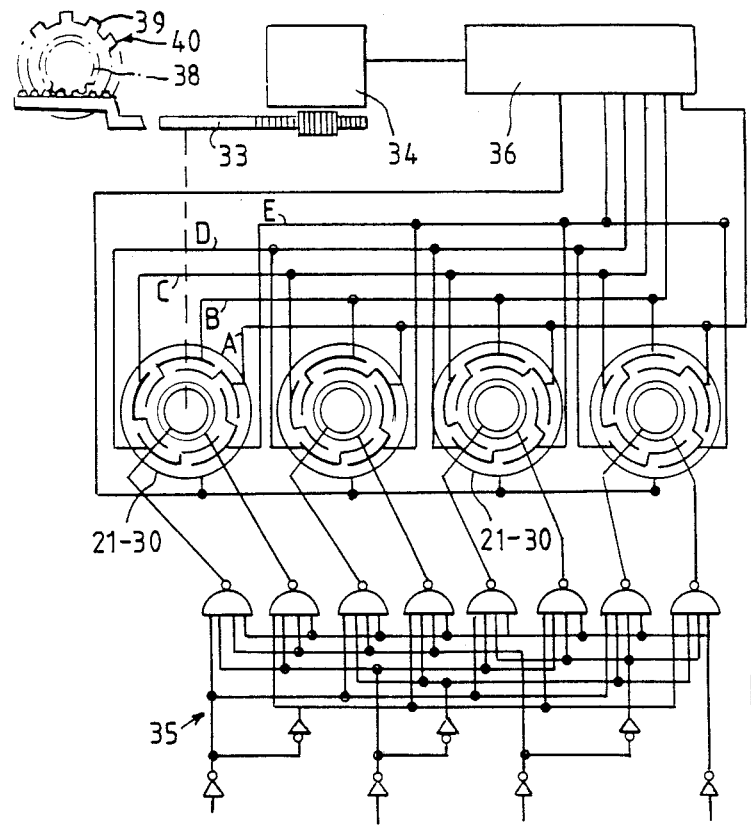
FIG. 3 is a block diagram of a position sensor utilising the encoding switch.
Figure 4:
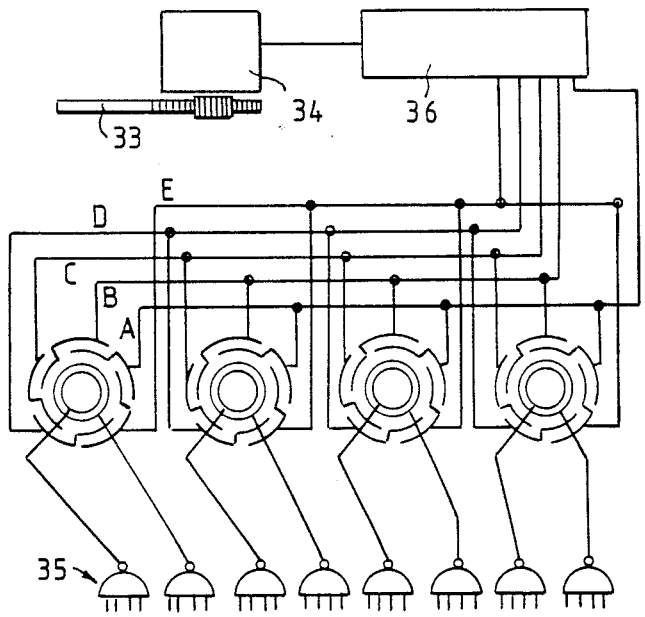
FIG. 4 is a block diagram of an alternative embodiment of a position sensor and FIG. 5 is a flow chart illustrating the functional steps in controlling the moving of an element to a required position.

The switch described hereinbefore is particularly suitable for sensing the setting of a print element in a postage franking machine where it is necessary to set the element to a selected one of ten angular positions to place that type character, corresponding to a required one of ten digits to be printed, at a printing position. In order to ensure that the required digit is correctly printed on a mail item it is necessary also to set the print element to a precise angular position. For this purpose the rotary part of the switch is mechanically coupled to the print element setting mechanism 33 (FIG. 3) of a postal franking machine in order to control the operation of an electromechanical drive 34, such as a stepper motor, used for setting the print element 38. The strips A to E and the arcuate strips 21 to 30 are connected to inputs of the microprocessor 36. When it desired to set the printing elements prior to effecting a franking operation the microprocessor interrogates the strips A to E while the rings 13 and 14 are held in turn to a fixed potential, for example ground, by a logic switch arrangement 35. The 2 out of 5 bit code word derived from this interrogation is then compared with the code word representing the required decimal position of the print element. If correspondence is not obtained the microprocessor 36 applies drive signals to the stepper motor to cause it to step until the comparison test indicates correspondence and hence that the type character on the printing element, corresponding to the digit to be printed, is located at the printing position 40. In order to set the print element at the required precise position to ensure correct printing of the digit, ring 13 (if the contact 31 is connected to contacts 17,18) is held at the fixed potential by the logic switching arrangement 35 and the arcuate strips 21 to 30 are tested by the microprocessor 36 to determine whether they are at that potential due to contact 31 wiping one of the arcuate strips. If the strips are at the potential, the microprocessor 36 applies drive signals to the stepper motor 34 to cause it to step until the test indicates that the strips 21-30 are not at the potential. Hence the printing element is now at the required precise position for correctly printing the required digit. It will be appreciated that it is usual for a franking machine to be constructed to print four digits by means of four printing elements. The setting mechanism for each printing element is mechanically coupled to a different one of the four switches respectively shown in FIG. 3, only one setting mechanism being shown in the drawing. The setting of each print element is tested and set to the required printing position in turn as described above. The microprocessor 36 is programmed such that, only when for each of the four printing elements correspondence is obtained from (a) the comparison test between the 2 out of 5 bit code word derived from the switch and the code word representing the desired position of the print element and (b) the test of the strips 21 to 30 indicates that they are not at the fixed potential, it generates an output signal on line 37 to initiate a printing and accounting operation of the franking meter.

The logic switch 35 for holding the rings 13, 14 at the fixed potential may be a BCD-to-decimal decoder/driver as described in patent specification 2034991. That specification also describes the use of a microprocessor to derive a 2 out of 5 bit code from the switches.

It will be realised that the provision of the strips 21-30 and the contact 31 has the effect of causing the contacts 18 or 20 on the rotary part 16 of the switch to be moved on a preset distance past the leading edges of the arcuate parts 10, 11, this preset distance being determined by the position of the gaps between the strips 21-30 relative to the leading edges of the arcuate parts 10,11 and by the angular relationship of the contact 31 and contacts 18 and 20.

Figure 5:
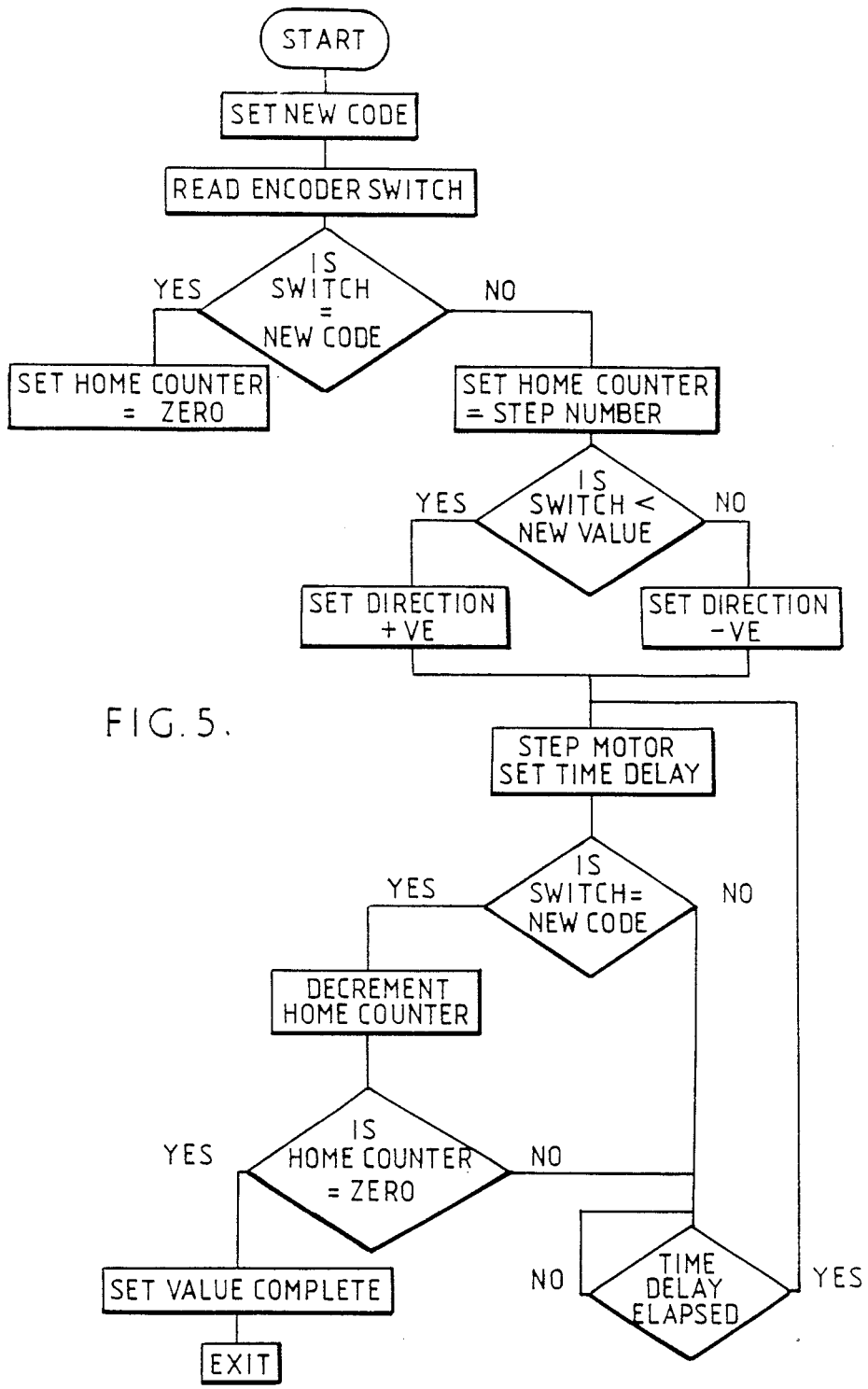

Instead of providing the arcuate strips 21-30 on the switch to provide an indication that the printing element is in the required precise location the setting mechanism may be controlled to move through a predetermined angle after initial derivation of the required code from the switch. A flow chart illustrating the sequence of steps carried out by the microprocessor 36 to achieve such control of one of the setting mechanisms is shown in FIG. 5. First the new code for the required decimal position of the print element is set in a register. This new code is compared with the current code derived from the switch. If the codes are equal a home counter is set to zero. If the codes are not equal the home counter is set to a count corresponding to the number of steps of the setting mechanism required to move the setting mechanism from a position in which the contacts 18, 20 first engage the ends of strips A to E to the required home position in which the print element is correctly positioned to effect printing. The relative values of the new and current codes is tested to set the required direction of rotation of the stepper motor of the setting mechanism. The motor is then stepped and a step timer delay is initiated. The new code is compared with the current code derived from the switch. If these are not equal, after elapse of the step timer delay, the motor is stepped again. If the codes are equal, the home counter is decremented. The count of the home counter is tested and if equal to zero a flag is set or a signal is generated to indicate that setting of the print element is complete. If the count is not equal to zero the motor is stepped again. It will be seen that the above steps cause the setting mechanism firstly to be stepped until the switch has been rotated to an angular position in which the code derived therefrom indicates that the required one of the type faces of the printing element is at the printing position and secondly to be stepped a number of steps, determined by the setting of the home step counter, until the printing element is at the required precise position for correct printing of the digit. By resetting the home step counter each time the code derived from the switch is equal to the required new code value, errors due to malfunction of the stepping of the motor are not cumulative.

During extensive use of the switch, it is likely that the ends of the arcuate parts 10, 11 will be subjected to wear and as a result the position of the leading and trailing edges thereof may change. If desired, the microprocessor may be programmed to determine at intervals the length of the spaces between adjacent parts and from this determination generate a value to which the home stepping counter is to be set so as to ensure that the positions, to which the rotary part of the switch and hence of the print element setting mechanism are driven, remain substantially unaffected by wear of the strips A-E.

I claim:

1. Apparatus for positioning a member at a precise predetermined position within a selected one of a plurality of ranges of positions including encoding means mechanically coupled to said member to derive a current position signal representing a current one of the plurality of ranges of positions at which the member is positioned; means to generate a new signal representing said selected one of said plurality of ranges of positions to which it is desired to move said member; comparison means for comparing said derived signal and said new signal; drive means responsive to said comparison means to move the member until said comparison means indicates that the current position signal and the new signal correspond and thereby indicates that the member has moved to said selected range of positions; and control means operative when the the current position signal and the new signal correspond to cause said drive means to move said member through a predetermined distance in which the current position signal and said new signal continue to correspond such that said member is positioned at said precise position within said selected range of positions represented by said new signal.

2. Apparatus for positioning a member at a precise predetermined position within a selected one of a plurality of ranges of positions including encoding means to derive a signal representing the current one of the plurality of ranges of positions at which the member is positioned; said encoding means comprising an encoding switch including first electrical contact strips respectively corresponding to said ranges of position and said strips being elongate and each having an end; means to generate a new signal representing said selected one of said plurality of ranges of positions to which it is desired to move, said member; comparison means for comparing said derived signal and said new signal; drive means responsive to said comparison means to move the member until said comparison means indicates that the member has moved to said selected range of positions; and control means operative when the member has moved to said selected range of positions to cause said drive means to move said member through a predetermined distance such that said member is positioned at said precise position within said selected range of position.

3. Apparatus as claimed in claim 2 wherein the control means includes second electrical contact strips in said encoding switch; said second strips being separated by nonconductive gaps respectively corresponding said ranges of positions, said non-conductive gaps being disposed at the predetermined distance from the ends of said first strips.

4. Apparatus as claimed in claim 2 wherein the member is driven in steps and wherein the control means includes step counting means operative when the member is in the selected range of positions to cause the member to be moved by a predetermined number of steps whereby the member moved to the predetermined position within the selected range of positions.

5. Apparatus for setting print element of a franking machine with a selected one of a plurality of types characters at a precise predetermined position in a printing position including position encoding means mechanically coupled to said print element to derive a current type character signal representing a current one of the plurality of type characters positioned at the printing position; means to generate a new signal representing said selected one of said plurality of type characters which it desired to move to said printing position; comparison means for comparing said current type character signal and said new signal; drive means responsive to comparison means to move the print element until said comparison means indicates that the current type character signal and the new signal correspond that the selected type character has moved to said printing posi and control means operative when the current type character signal and the new signal correspond and the selected type character has moved to said printing position to cause said drive means to move said print element through a predetermined distance in which the current type character signal and the new signal continue to correspond such that said selected type character represented by said new signal is positioned at said precise position within the printing position.

6. Apparatus for setting a print element of a franking machine with a selected one of a plurality of type characters at a precise predetermined position in a printing position including position encoding means, said position encoding means comprising an encoding switch including first electrical contact strips respectively corresponding to the type characters of the print element, said first strips being elongate and having an end, said encoding switch being operative to derive a signal representing the current one of the plurality of type characters positioned ar printing position; means to generate a new signal representing said selected one of said plurality of type characters which it is desired to move to the printing position; comparison means for comparing said signal and said new signal; drive means responsive to said comparison means to move the print element until said comparison means indicates that the selected type character has moved to said printing position; and control means operative when the selected type character has moved to said printing position to cause said drive means to move said print element through a predetermined distance such that said selected type character is positioned at said precise position within the printing position.

7. Apparatus as claimed in claim 6 wherein the control means includes second electrical contact strips in said encoding switch; said second strips being separated by non-conductive gaps respectively corresponding to said type characters; said non-conductive gaps being disposed at a distance corresponding to said predetermined distance from the ends of said first strips.

8. Apparatus as claimed in claim 6 wherein the print element is driven in steps and wherein the control means includes step counting means operative when the selected type character is in the printing position to cause the print element to be moved by a predetermined number of steps whereby the print element is moved to bring the selected type character into said predetermined position within the printing position.

9. A method of positioning a member at a precise determined location comprising the steps of deriving a current position code signal from position encoding means mechanically coupled to said member representing a current range of positions of said member; generating a new code signal representing a selected range of positions to which the member i to be moved; comparing the current position code signal derived from the encoding means with the new code signal; moving said member until said comparison indicates correspondence between said current position code signal and said new code signal and that the member has moved to said selected range of positions; and subsequently moving said member through a predetermined distance in which the current position code signal and the new code signal continue to correspond such that said member is located at a precise determined position within said selected range of positions represented by said new code signal.

10. A method of setting a print element of a franking machine to position a selected one of a plurality of type characters in a precise printing position comprising the steps of deriving a current type character code signal from a position encoder mechanically coupled to said print element representing that type character currently in said printing position; generating a new code signal representing a selected type character to be moved into the printing position; comparing the code signal derived from the position encoder with the new code signal; moving said print element until said comparison indicates that the current type character code signal corresponds to the new code signal and that the selected type character is in the printing position; and subsequently moving said print element through a predetermined distance in which the current type character code signal and said new code signal continue to correspond such that the selected type character represented by the new code signal is located at a precise determined position within said printing position.

* * * * *